(12) United States Patent
Wendling

(10) Patent No.: US 7,783,282 B2
(45) Date of Patent: Aug. 24, 2010

(54) MESSAGING OVER MOBILE PHONE NETWORK FOR DIGITAL MULTIMEDIA NETWORK

(75) Inventor: Bertrand Wendling, Viroflay (FR)

(73) Assignee: Nagra Thomson Licensing, Boulogne (FR)

( * ) Notice: Subject to any disclaimer, the term of this patent is extended or adjusted under 35 U.S.C. 154(b) by 612 days.

(21) Appl. No.: 10/537,178

(22) PCT Filed: Nov. 21, 2003

(86) PCT No.: PCT/EP03/50866

§ 371 (c)(1),
(2), (4) Date: Oct. 31, 2005

(87) PCT Pub. No.: WO2004/052004

PCT Pub. Date: Jun. 17, 2004

(65) Prior Publication Data

US 2006/0141988 A1    Jun. 29, 2006

(30) Foreign Application Priority Data

Dec. 2, 2002  (EP) .................................. 02292960

(51) Int. Cl.
*H04L 12/58* (2006.01)

(52) U.S. Cl. .................... 455/412.1; 455/410; 455/411; 455/412.2; 455/419; 455/466; 378/14.02; 378/435

(58) Field of Classification Search .............. 455/412.1, 455/410, 414.3, 419, 466, 411; 378/14.02, 378/465; 380/210, 211
See application file for complete search history.

(56) References Cited

U.S. PATENT DOCUMENTS 5,931,905 A    8/1999  Hashimoto et al.
6,057,872 A  *  5/2000  Candelore .................... 725/23

(Continued)

FOREIGN PATENT DOCUMENTS

JP    0 793 387 A2    9/1997

(Continued)

OTHER PUBLICATIONS

Functional Model of a Conditional Access System, EBU Technical Review, No. 266, Dec. 21, 1995, 14 pages.

*Primary Examiner*—Patrick N Edouard
*Assistant Examiner*—Julio Perez
(74) *Attorney, Agent, or Firm*—Osha • Liang LLP

(57) ABSTRACT

A method of distributing a message from a message administration service to a subscriber receiver decoder of a digital multimedia network comprises transferring a determined message for a determined receiver decoder from the message administration service to a point to point communication system distinct from the multimedia network. A destination point address of a receiver in the point to point communication system is determined, corresponding to the determined receiver decoder. The determined message is buffered in the point to point communication system, and retrieved at the determined receiver decoder from the receiver.

9 Claims, 7 Drawing Sheets

U.S. PATENT DOCUMENTS

| | | |
|---|---|---|
| 6,175,743 B1 * | 1/2001 | Alperovich et al. .......... 455/466 |
| 6,463,585 B1 | 10/2002 | Hendricks et al. |
| 6,466,671 B1 | 10/2002 | Maillard et al. |
| 7,296,091 B1 * | 11/2007 | Dutta et al. .................. 709/245 |
| 2003/0105812 A1 * | 6/2003 | Flowers et al. .............. 709/203 |
| 2003/0140769 A1 * | 7/2003 | Davis et al. .................... 84/609 |
| 2004/0249768 A1 * | 12/2004 | Kontio et al. .................. 705/65 |
| 2004/0259531 A1 * | 12/2004 | Wood et al. ............... 455/412.1 |
| 2004/0260760 A1 * | 12/2004 | Curnyn ....................... 709/201 |
| 2005/0043020 A1 * | 2/2005 | Lipsanen et al. ......... 455/422.1 |
| 2005/0286689 A1 * | 12/2005 | Vuori ...................... 379/88.22 |

FOREIGN PATENT DOCUMENTS

| | | |
|---|---|---|
| JP | 2001-345766 A | 12/2001 |
| JP | 2002-016565 A | 1/2002 |
| JP | 2002-246996 A | 8/2002 |
| WO | 98/43426 A1 | 10/1998 |
| WO | WO-98/43426 A1 | 10/1998 |
| WO | WO-01/17249 A1 | 3/2001 |

* cited by examiner

US 7,783,282 B2

MESSAGING OVER MOBILE PHONE NETWORK FOR DIGITAL MULTIMEDIA NETWORK

FIELD OF THE INVENTION

The invention relates to management of access rights in a digital multimedia network.

BACKGROUND OF THE INVENTION

FIG. 1 schematically illustrates an example of a digital multimedia network. A network 1 is used to exchange information between one or many broadcast operators, represented in boxes 2 and 3, and subscribers represented in boxes 4 to 6. The network may for example be a terrestrial television broadcast network in which the broadcast operators emit signals that are received by means of an aerial antenna by the subscriber. Another example of network may be a cable network, or a satellite transmission network.

Each broadcast operator may broadcast a number of digital multimedia services to the subscribers. The multimedia services may for example include television programmes, radio programmes, and interactive applications.

Each subscriber has a receiver decoder that is used to receive the multimedia services and in some cases to process the received multimedia services in order to render the multimedia services on a rendering device as appropriate. A television programme may for example be rendered on a television, and an interactive application may need to be executed by a processing system of the receiver decoder and generate interactivity with the subscriber.

Typically all digital multimedia services are received by all subscribers. More generally, all information broadcast by the broadcast operators over the network may potentially be received by all subscribers.

It is known to restrict access to multimedia services by attributing access rights to the subscribers. Hence a subscriber may only access such multimedia service for which he possesses corresponding access rights. A higher degree of restricted access to the multimedia services may be achieved by scrambling a service using a control word. In this case the subscriber may only access and unscramble the scrambled service if he possesses the control word.

Access right information may be broadcast to the subscribers 4-6 over the network 1. Typically the control word is broadcast to all subscribers using an Entitlement Control Message (ECM). However the control word may only be extracted from the ECM if the subscriber has access to an exploitation key that is periodically broadcast over the network in an Entitlement Management Message (EMM).

The publication of the international application WO01/17249A1 DEUTSCHE TELECOM AG concerns a method for releasing customer specific authorisations using security modules in conditional-access systems for chargeable devices. WO01/17249A1 describes to transmit EMMs to subscribers. A first possibility provides for transmitting an EMM using a Public Switched Telephone Network (PSTN), a mobile phone network such as a GSM network, or any other way of broadcast to transmit the EMM to a control device of a vendor. The vendor on turn uses the control device to transmit the EMM to a subscriber device in order to activate a subscription. The first possibility is said to be indirect because it requires an intervention of an intermediate between a provider and the subscriber, in this case the vendor. A second possibility provides for transmitting the EMM directly by broadcast to the subscriber device. A geographical localisation of the subscriber device may be effected by exploiting localisation data relative to a subscriber GSM device. A GSM network provider has the possibility to determine a geographical localisation of a subscriber's GSM device if this device is switched on. The knowledge of the geographical localisation of the subscriber device may allow to restrict the broadcast of the EMM to a restricted geographical localisation, if at all possible. The second possibility also mentions an embodiment according to which to which the subscriber first calls the EMM provider by using his GSM phone and subsequently obtains the EMM by broadcast.

WO01/17249A1 further describes the possibility to use the GSM phone network to transmit an EMM to a subscriber. However WO01/17249A1 advises not to use the GSM phone network for this purpose.

The publication *Functional model of a conditional access system*, EBU Technical review, Winter 1995, describes in paragraph 7.2.1 that it would be possible to establish a return path between a subscriber's decoder and a Subscriber Management System (SMS) using either the PSTN or a cable network, and to use this return path to transmit EMMs. One reason for using a return path would be to reduce broadcast bandwidth consumed by the broadcast of EMMs.

SUMMARY OF THE INVENTION

In a first aspect the invention provides a method for distributing a message from a message administration service to a subscriber receiver decoder of a digital multimedia network. A determined message for a determined receiver decoder is transferred from the message administration service to a point to point communication system distinct from the multimedia network. A destination point address of a receiver in the point to point communication system is determined, corresponding to the determined receiver decoder. The determined message is buffered in the point to point communication system, and the determined message retrieved at the determined receiver decoder from the receiver.

Preferably the determined message is buffered at an emitter point in the point to point communication system, corresponding to the message administration service. A signal of availability is generated at the receiver. On reception of the signal of availability an emission of the determined message is triggered, and the determined message is emitted to the receiver.

In a second aspect the invention provides a method for receiving a determined Entitlement Management Message (EMM) at a determined subscriber receiver decoder in a digital multimedia network. The determined subscriber receiver decoder is enabled to receive information through a mobile phone communication network distinct of the digital multimedia network. A message containing at least the determined EMM is received in a mobile phone modem of the receiver decoder, the message being addressed specifically to the mobile phone modem of the determined receiver decoder. At least the EMM is stored in a storage of the mobile phone modem.

In a third aspect, the invention provides a receiver decoder for a digital multimedia network, comprising a mobile phone modem operatively connected to the receiver decoder, and a destination point address uniquely attributed to the mobile phone modem. The receiver further comprises a storage space in the mobile phone modem to store at least an Entitlement Management Message (EMM).

BRIEF DESCRIPTION OF THE FIGURES

The invention will now be described in greater detail with reference to the accompanying drawings, in which FIG. 1 contains a schematic representation of a digital multimedia network.

DESCRIPTION OF THE PREFERRED EMBODIMENTS

System Overview

Same references will be used to reference same elements in the Figures throughout the description.

Figure 1:
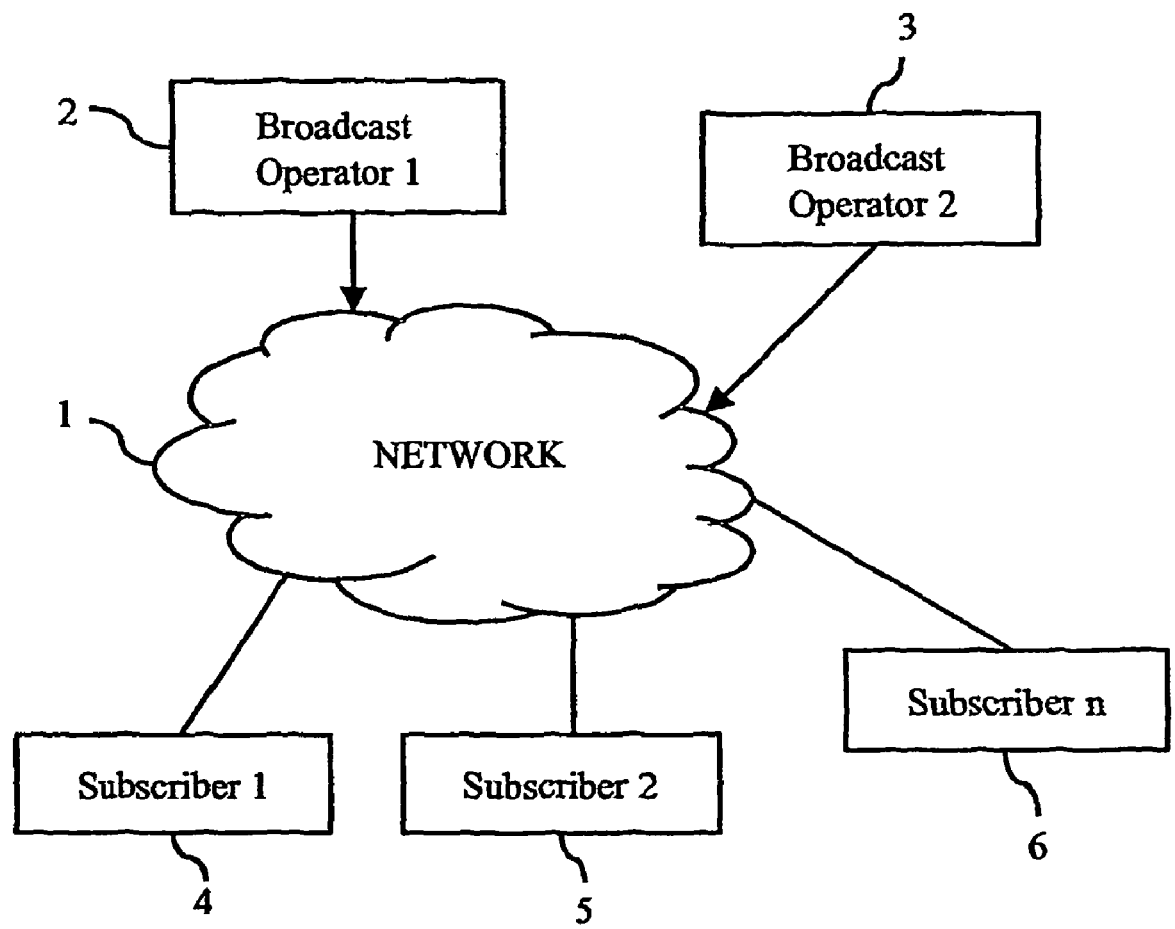
Figure 2:
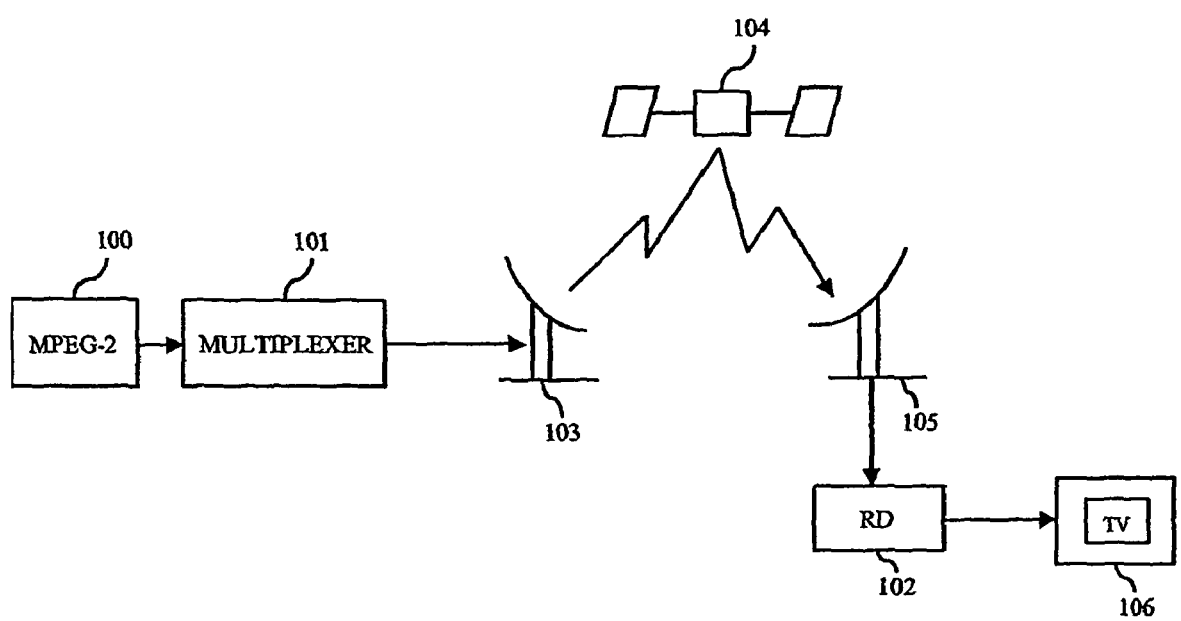
FIG. 2 illustrates a broadcast and receiver system for a digital multimedia network, FIG. 3 contains a schematic representation of a conditional access system applied to a broadcast receiver system.

FIG. 2 contains a schematic illustration of a digital television system. On a side of a broadcaster, a signal compression system 100 compresses a digital signal stream (not shown) and outputs a compressed stream to a multiplexer 101. An example of compression is the well known MPEG-2 standard, which is widespread in the field of digital television services. The multiplexer 101 produces a transport stream of compressed signals that is transmitted to a subscriber having a receiver decoder 102. The transport stream is emitted using an antenna to a satellite 104 and subsequently broadcast to a receiving antenna 105 that is connected to an input of the receiver decoder 102. FIG. 2 illustrates a satellite transmission system, but any other way of transmitting the transport stream from the side of the broadcaster to the subscriber may be used.

The receiver decoder 102 processes the received transport stream in order to extract data, such as for example an audio/visual service or an application, and outputs resulting video and audio signals to a rendering device, such as for example a television 106. In the present example the receiver decoder 102 may decode the compressed MPEG-2 stream into a television signal output to the television 106.

Although a separate receiver decoder 102 is shown, the receiver decoder may also be an integral part of an digital television.

In a multichannel system, the multiplexer 101 may handle audio and video information provided simultaneously by a plurality of sources. In addition to audio and video information, any other sort of information, e.g., messages or applications may be introduced in one or more of the channels, interlaced with the audio and video information.

Figure 3:
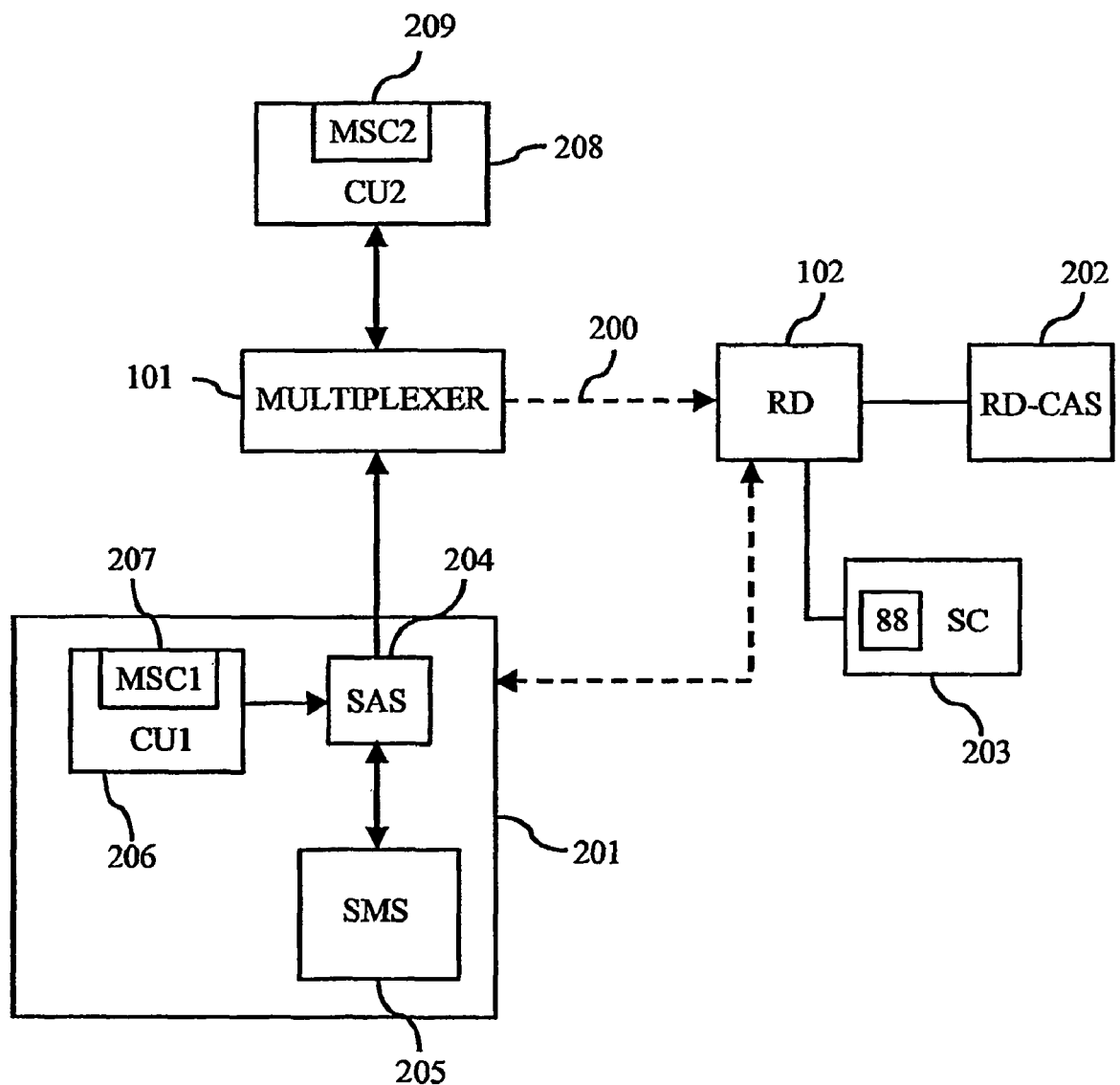

FIG. 3 illustrates the digital television system from FIG. 2 enhanced with an umber of security devices. For reasons of better readability, broadcast transmission features from FIG. 2 have been replaced by a dotted arrow 200 in FIG. 3. A conditional access system 201 is connected to the multiplexer 101. A further component of conditional access 202 is connected to the receiver decoder 102. The conditional access system 201 and the further component of conditional access 202 enable a secured access in the receiver decoder 102 to digital television services broadcast by one or many broadcast suppliers. The further component of conditional access 202 is completed by a daughter smartcard 203 that is inserted into an appropriate location of the receiver decoder 102. The daughter smartcard 203 carries information required to descramble scrambled messages related to available commercial offers. The information may comprise subscription rights, one or more exploitation keys extracted from received EMMs and one or more control words extracted from ECMs. Using the daughter smartcard 203 it is possible to purchase commercial offers by way of subscription or pay per view.

Digital services included in the digital data stream are scrambled at a level of the multiplexer 101, under control of the conditional access system 201. Typically, scrambling is done using a control word, the latter being transmitted together with the scrambled digital services for eventual descrambling. The control word itself is encrypted for transmission, the encryption being done with an exploitation key.

The conditional access system 201 comprises a Subscriber Authorization System (SAS) 204, which is connected to one or a plurality of Subscriber Management System(s) (SMS) 205. The SMS 205 and the SAS 204 may be linked for example using a TCP/IP link. Typically there is one SMS 205 per broadcast operator, but it may happen that the SMS 205 is shared by more than one broadcast operator.

The conditional access system 201 further comprises a first Ciphering Unit 206 that makes use of a first Mother Smart-Card 207, and is connected to the SAS 204. The first mother smartcard 207 stores confidential information that is used to encrypt data.

A second Ciphering Unit 208 that uses a Second Mother SmartCard 209 is connected to the multiplexer 101.

Subscriber Management System

The SMS 205 includes a database that manages, amongst others, subscriber files, commercial offer data including pricing and special offers, pay per view details, authorisation and consumption data.

The SMS 205 may be remote from the SAS 204.

The SMS 205 transmits messages to the SAS 204 relating for example to a subscriber's authorisations to view a digital service when such a digital service is requested by the subscriber, or to a pricing of a digital service acquired and to be paid by the subscriber.

On the other hand the SAS 204 may send messages to the SMS 205 relating for example to requests about a subscriber contact identification.

Entitlement Management Message (EMM)

The EMM is a message dedicated to an individual subscriber, or a group of subscribers. This is in contrast with the ECM, which is generally dedicated to one or a determined number of scrambled digital service(s) rather than being dedicated to one or many subscribers.

Various specific types of EMMs are possible. In the following, 4 examples of types of EMM will be described, namely individual group, audience and unique EMMs.

An individual EMM is dedicated to an individual subscriber, and may typically be used in provision of a pay per view service. The individual EMM comprises a group identifier and a position of the individual subscriber in the group.

A group EMM is dedicated to a group of subscribers, e.g. 256 individuals subscribers, and is typically used for administrating subscription services.

An audience EMM is dedicated to an entire audience of individual subscribers. The audience comprises all individual subscribers having a smartcard that bears a same operator identifier.

A unique EMM is dedicated to be addressed to a unique identifier of a smartcard.

Figure 4:
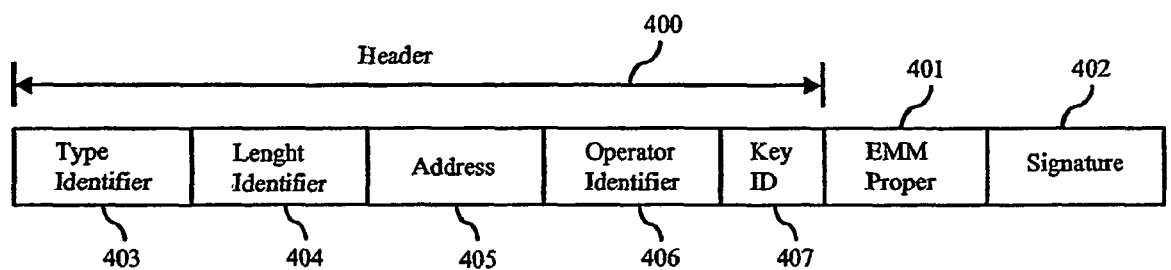
FIG. 4 illustrates an example of an Entitlement Management Message, FIG. 5 contains a block diagram representing an example of a receiver decoder, FIG. 6 contains a schematic representation of an example of embodiment of the invention, FIG. 7 contains a flowchart illustrating an example of embodiment of the invention

FIG. 4 illustrates an example of a general form of an EMM. The EMM is implemented as a series of digital data bits and comprises a header 400, an EMM proper 401 and a signature 402. The header 400 in turn comprises a type identifier 403 that identifies the message as an EMM and also indicates the type of EMM, a length identifier 404 that gives a length of the EMM, an optional address 405 for the EMM, an operator identifier 406, and a key identifier 407. The signature 402 is optional and provides a number of checks against corruption of the data bits in the EMM.

The EMM proper comprises data relating to subscriber authorisation and to one or many exploitation keys.

Subscriber Authorization System (SAS)

Referring again to FIG. 3, the SAS 204 receives and processes messages from the SMS 205. The SAS 204 generates messages acknowledging receipt of the messages generated by the SMS 205 and passes these acknowledgement messages to the SMS 205.

The messages received from the SMS 205 concern for example a suspension of a susbcriber's rights in case the subscriber failed to pay his subscription fee, a modification of subscriber's rights in order to add or remove a commercial offer, or an addition of rights that are required to access a specific pay per view digital service.

The SAS 204 manages a database that stores a status for each subscriber previously declared by the SMS 205. According to the status and other information received from the SMS 205, the SAS 204 generates one or more EMMs at the intention of the subscriber's smartcard 203. The EMMs are ciphered using the first ciphering unit 206.

In network systems known from prior art, the SAS 204 ensures that the EMMs are received by the subscriber by sending the EMMs cyclically to the multiplexer 101 for broadcast to the subscriber. A frequency of the cycle depends of the type of EMM, and may typically have a value between 30 seconds and 30 minutes.

The EMMs are sent to the multiplexer 101 through a device commonly known as injector (not shown in FIG. 3). The injector is well known in the art and will not be described here any further.

Entitlement Control Message (ECM)

Referring again to FIG. 3, the multiplexer 101 typically contains a scrambler that is used to scramble digital services to be broadcast. The scrambler generates a control word that will be used in the scrambling process, and transmitted together with the scrambled digital service to the subscriber.

A digital service may also be subject to access criteria, which for example associate the digital service to a determined commercial offer. The access criteria should match a subscriber's subscription to the determined commercial offer in order for the digital service to become accessible to the subscriber.

Both the control word and the access criteria are inserted into an ECM that is broadcast together with the scrambled digital service. The insertion is done by transmitting the control word and the access criteria to the second ciphering unit 208 where the ECM is generated, scrambled using an exploitation key stored in the second mother smartcard 209 and transmitted back to the multiplexer 101.

The digital service is scrambled by the scrambler using the control word. Subsequently the scrambled digital service and the scrambled ECM are broadcast to the subscriber.

Receiver Decoder

Figure 5:
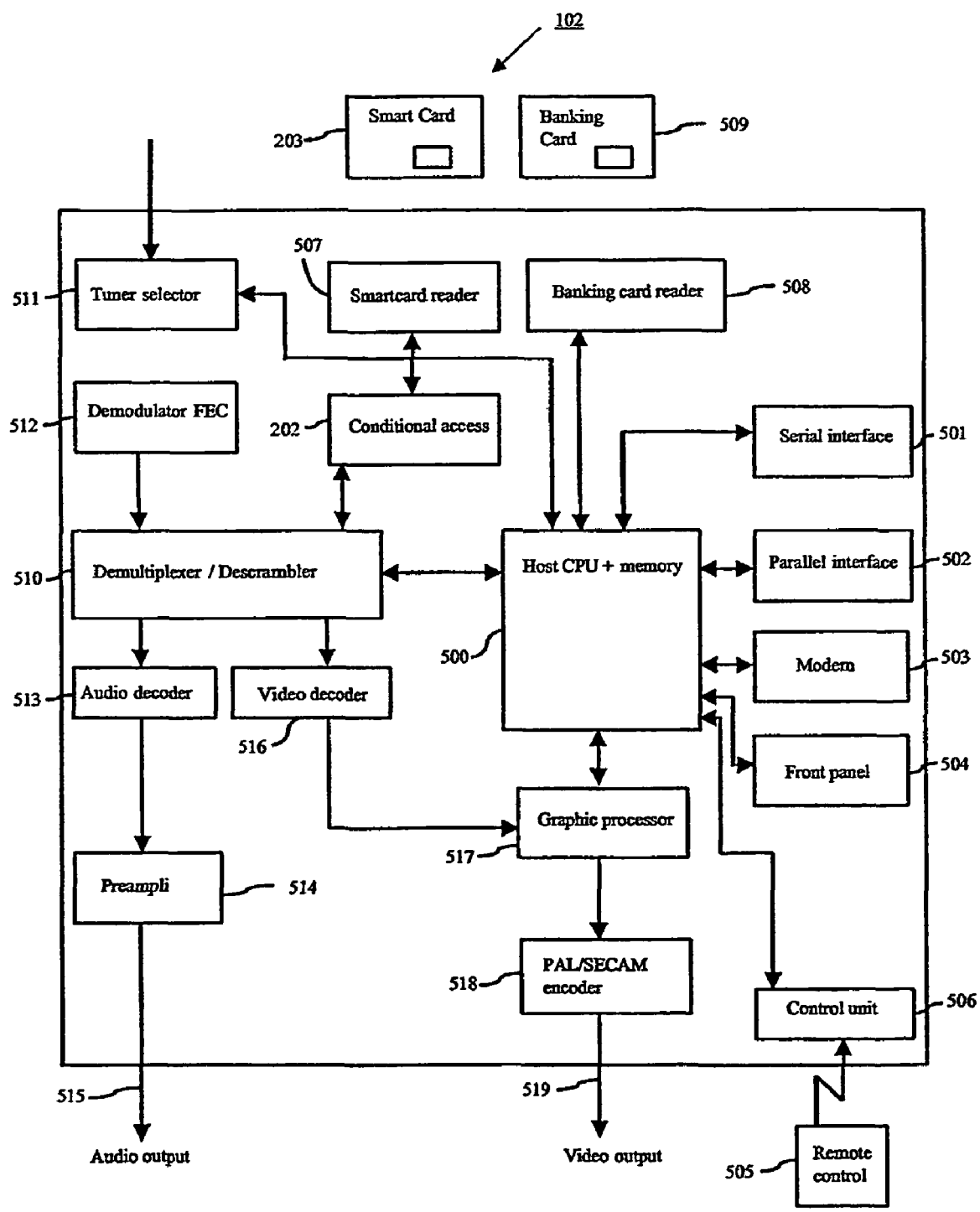

Referring to FIG. 5, an overview is given for various elements in an embodiment of the receiver decoder 102, shown here as functional blocks.

The receiver decoder 102 is sometimes also referred to as a Set Top Box (STB). The receiver decoder 102 comprises a central processor 500 including associated memory elements. The central processor 500 is adapted to receive input data from a serial interface 501, a parallel interface 502, a modem 503 and switch contacts 504 located on a panel of the receiver decoder 102.

The receiver decoder is further adapted to receive inputs from an infra-red remote control 505 via a control unit 506, and comprises one or many smartcard readers 507 and 508 that allow to read a bank smartcard 509 or the daughter smartcard 203. The daughter smartcard 203 engages with the smartcard reader 507 and the further component of conditional access 202, in order to supply the necessary control word to a demultiplexer/descrambler 510, and hence enable the encrypted broadcast signal to be descrambled.

The receiver decoder 102 further comprises a conventional tuner 511 and a demodulator 512 to receive and demodulate the broadcast signal before processing by the demultiplexer/descrambler 510.

The decrypted signal at an output of the demultiplexer/descrambler 511 is processed as appropriate by an audio decoder 513 and preamplifier 514 before being made available at an audio output 515, and by a video decoder 516, before being transmitted to a graphic processor 517 and encoder in a PAL/SECAM encoder 518 and made available at a video output 519.

Cyclical Transmission of EMMs

As mentioned before in this specification, EMMs from prior art systems are permanently broadcast to the subscribers in a carousel mode, i.e., cyclically transmitted, over all broadcast means. This is done in order to ensure that independently of a state of a receiver decoder and of a geographical location of the receiver decoder, as soon as the receiver decoder is switched on it will be able to receive the related EMM for a forthcoming subscription period.

Using the cyclical transmission uses a relatively large amount of broadcast bandwidth. Moreover it is impossible to know if or when a determined receiver decoder as received an EMM.

A cycle period of the EMM broadcast needs to be reasonably short in order to avoid that a long waiting time occurs until reception of the EMM by a receiver decoder that has been switched off for an extended period of time.

It is known to reduce the broadcast bandwidth required for broadcasting EMMs by using group EMMs that may reach more than one user.

In the well known DVB broadcast standard, an EMM is typically broadcast as a message having a specific determined identification number. Since the EMM may be received by anyone receiving the broadcast, it is potentially feasible to analyse the messages received having the specific determined identification number in order to gather information about the EMMs and a related security scheme. This may in some cases weaken the level of security of the broadcast system.

Transmission of EMMs Over a Mobile Phone Network

According to the present invention, the EMMs are transmitted to the subscribers using a mobile phone network rather than the broadcast network. The mobile phone network allows a point to point communication, i.e. a message may be transmitted from one emitter point to a single destination point address.

Figure 6:
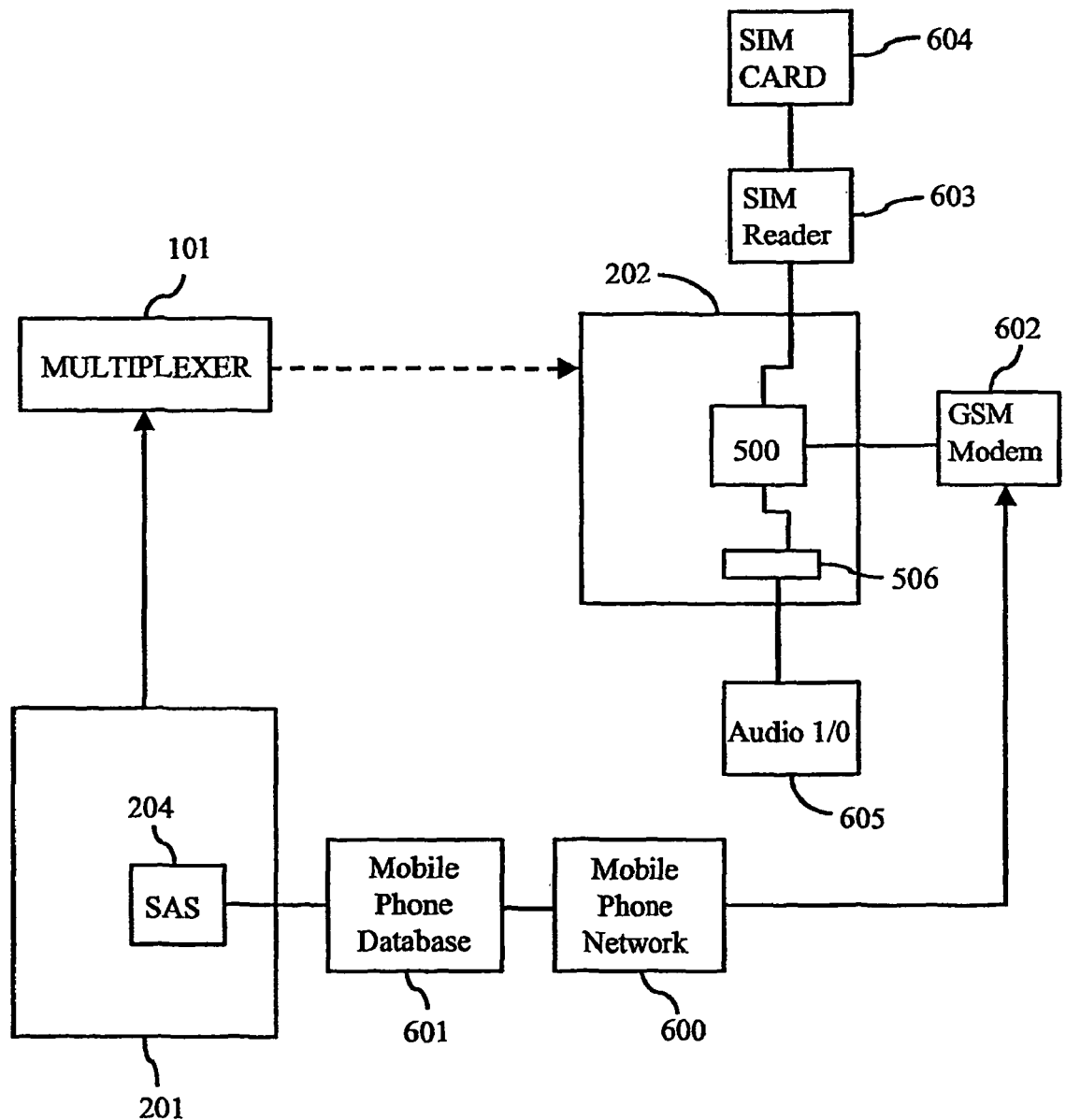

Referring to FIG. 6 a system is shown in which EMMs are transmitted over a mobile phone network 600. The system in FIG. 6 is based on the system shown in FIG. 3, and the receiver decoder 202 is based on the receiver decoder shown in FIG. 3 and FIG. 5. For reasons of better readability a number of elements shown in FIGS. 3 and 5 have not been represented in FIG. 6.

The SAS 204 transmits the EMMs to a mobile phone database 601 rather than transmitting the EMMs through an EMM injector to the multiplexer 101. Each EMM is intended for at least one determined receiver decoder. The determined receiver decoder relates to an address in the mobile phone network, i.e. the destination point address, that is stored in the mobile phone database 601. Accordingly, the mobile phone database allows to retrieve the address for the determined receiver decoder when receiving the EMM from the SAS. The address will be used to send the EMM to the determined receiver decoder.

The EMM and the corresponding address of the determined receiver decoder are subsequently forwarded to the mobile phone network 600, i.e. to the emitter point of the mobile phone network, where a network management system and a local cell transmitter (not shown) sends the EMM to a mobile phone receiving modem 602 connected to or integral with the receiver decoder 202, and having the corresponding address received together with the EMM.

The EMM remains buffered in the mobile phone network or the mobile phone receiving modem until it is retrieved by the receiver decoder. More precisely the EMM may remain stored at the level of the mobile phone network 600 if the mobile phone receiving modem 602 is not available for receiving messages. Once the mobile phone receiving modem 602 becomes available, i.e. the mobile phone receiving modem 602 generates a signal stating that it is available, the EMM is transmitted. The EMM remains stored in the mobile phone receiving modem 602, until it is retrieved by the receiver decoder. This is the case in particular when the receiver decoder is switched off or down for other reasons.

Optionally the receiver decoder 202 comprises a SIM card reader 603 adapted to read a SIM card 604. The SIM card 604 contains information required to manage access rights for the mobile phone network, the access rights being used by the mobile phone receiving modem 602.

Advantageously the access rights for the mobile phone network may be included on the daughter smartcard (not shown) instead of the SIM card 604.

The specific EMM is sent only once from the SAS 204 to the mobile phone database 601 and network 600. The specific EMM remains in the mobile phone system and is only transmitted to the modem 602 when the latter is ready to receive the specific EMM. If the specific EMM becomes outdated by that time it may preferably be deleted and/or replaced without having been previously sent to the receiver decoder 202.

Optionally the modem 602 may return a confirmation message to the mobile phone network after receiving the specific EMM. The confirmation message may comprise additional data such as specific receiver decoder data or data related to the daughter smartcard in use with the receiver decoder 202. An example of information comprised in the additional data may be obtained using one or a plurality of items out of the following list: status of the receiver decoder, status of the daughter smartcard, identification number(s), version of elements contained in the receiver decoder. The transmission of the conformation message comprising additional data may provide a method that allows the broadcaster to verify parameters of the receiver decoder and detect a legal status of the receiver decoder, i.e., a possible illegal use of the receiver decoder or the daughter smartcard.

The specific EMM may be transmitted to the modem 602 embedded in a small message commonly known as SMS (Short Message Service, not to be confused with the Subscriber Management System) in the GSM mobile phone networks. The SMS may remain stored in a SMS server of the GSM mobile phone network if the mobile phone receiver modem is not ready or available for receiving messages.

As a result of the invention, the EMM injector known from prior art, which is used by the SAS to inject EMMs to the multiplexer, may be omitted.

Optionally the GSM modem 602 may also be used together with the receiver decoder 202 to communicate over the mobile phone network 600 by emitting phone calls or establishing data connections. For this purpose the receiver adapter 202 may comprise audio input and output devices 605, including a microphone.

It has become apparent that each EMM is sent uniquely to its associated receiver decoder using a network distinct from the broadcast network. Accordingly the invention uses no broadcast bandwidth as in prior art. The EMM may be sent over the mobile phone network at convenient times when the network capacity is less used by conventional mobile phone services. As is well known in mobile phone networks, the information sent to the mobile phone modem will only be transmitted inside a geographical area corresponding to a transmission cell in which the phone modem in located.

Advantageously the receiver decoder 202 need not explicitly initiate a connection to the CAS 201 to receive an EMM.

Optionally the mobile phone modem 602 may be configured to always remain in reception not only of an EMM, but also of any other type of information or incoming mobile phone service if required.

The system according to the invention improves security in that the specific EMM is sent to one receiver decoder only. It becomes more difficult to receive and listen to more than one EMMs as was the case in prior art.

The optional conformation messages improves security in the system, in that the use of the EMM by a determined receiver decoder may be verified.

The mobile phone modem 602 has been described as a GSM modem. It is of course possible to have any other type of modem depending on the mobile phone network's standard, e.g., GSM, GPRS, UMTS . . . .

Figure 7:
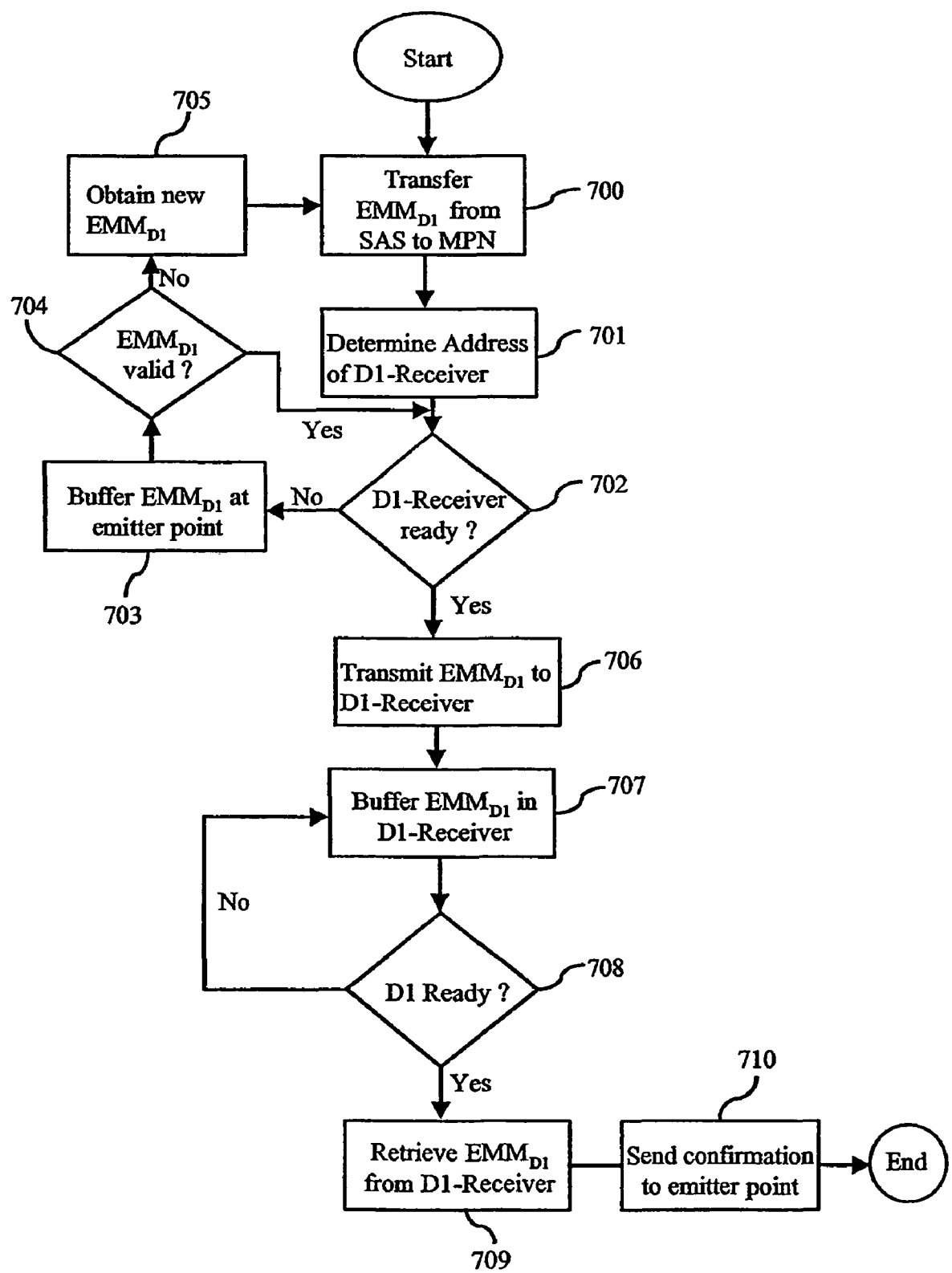

FIG. 7 shows a flowchart illustrating an embodiment of the invention. An Entitlement Management Message $EMM_{D1}$ intended for a receiver decoder D1 is transferred from the SAS to the Mobile Phone Network (MPN) in a step 700. In a next step 701 an address of a mobile phone receiver (D1-receiver) for the receiver decoder is determined. In a decision step 702, the MPN checks whether the D1-receiver is ready to receive $EMM_{D1}$. If the D1-receiver is not ready then $EMM_{D1}$ is buffered at the emitter point of the MPN in step 703. Subsequently a decision step 704 checks to see if $EMM_{D1}$ is still valid, e.g., if a date of validity for $EMM_{D1}$ might have expired. In case $EMM_{D1}$ is not valid, then a new $EMM_{D1}$ is obtained in step 705 and step 700 executed again. In case $EMM_{D1}$ is found to be valid, then the decision step 702 is performed again.

If at an issue of step 702 the D1-receiver is found to be ready, then $EMM_{D1}$ is transmitted to the D1-receiver over the MPN in a step 706, and buffered in the D1-receiver in step 707. In a decision step 708 it is checked whether the receiver decoder D1 is ready to retrieve $EMM_{D1}$ from the D1-receiver. If this is not the case then $EMM_{D1}$ remains in buffer with the D1-receiver. In the affirmative, $EMM_{D1}$ is retrieved from the D1-receiver by the D1 receiver decoder in a step 709. Subsequently a confirmation of reception for $EMM_{D1}$ is returned to the emitter point in step 710, e.g., using the MPN.

Having described preferred embodiments of the invention with reference to the accompanying drawings, it is to be understood that the invention is not limited to these precise embodiments and that various changes and modifications could be effected therein by a person skilled in the art without departing from the spirit or scope of the invention as defined in the appended claims.

The invention claimed is:

1. A method for distributing a message from a message administration service to a subscriber receiver or decoder of a digital broadcast multimedia network, the method comprising:
retrieving a point-to-point communication address for said receiver or decoder;
transferring a determined message for a determined receiver or decoder from the message administration service to a point-to-point communication system that is operatively connected to the receiver or decoder and is distinct from the digital broadcast multimedia network, wherein the point-to-point communication system is a mobile phone network, and wherein the determined message comprises access rights pertaining to the reception of data by the digital broadcast multimedia network;
buffering the determined message at an emitter point in the point-to-point communication system corresponding to the message administration service;
generating a signal of availability at the receiver, triggering for emission of the determined message; and
upon reception of the signal of availability, emitting the determined message to the receiver;
retrieving, at the determined receiver or decoder, the determined message from the point-to-point communication system; and
loading the determined message into the receiver or decoder and updating the access rights related to the reception of data by the digital broadcast multimedia network.

2. The method according to claim 1, further comprising:
receiving the determined message at the receiver; and
buffering the determined message at the receiver.

3. The method according to claim 2, further comprising:
generating a confirmation of receipt at the receiver; and
emitting the confirmation of receipt to the emitter point.

4. The method according to claim 1, further comprising:
generating a confirmation of receipt at the receiver; and
emitting the confirmation of receipt to the emitter point.

5. The method according to claim 4, in which the confirmation of receipt comprises at least one of a plurality of items of additional information selected from the group consisting of a status of the receiver or decoder, a status of a daughter smartcard used with the receiver or decoder, and a version number of an element of the receiver or decoder.

6. The method according to claim 5, further comprising:
extracting the at least one item of additional information from the confirmation of receipt; and
evaluating the at least one item of additional information to determine a legal status of the receiver or decoder.

7. The method according to claim 1, wherein the message administration service is included as part of a Subscriber Authorization System.

8. The method according to claim 1, further comprising:
receiving the determined message at the receiver; and
buffering the determined message at the receiver.

9. The method according to claim 1, further comprising:
generating a confirmation of receipt at the receiver; and
emitting the confirmation of receipt to the emitter point.

* * * * *